US012222016B2

(12) United States Patent
Jimenez et al.

(10) Patent No.: US 12,222,016 B2
(45) Date of Patent: Feb. 11, 2025

(54) SEGMENTED CENTRIFUGAL PENDULUM ABSORBER MASS CARRIER

(71) Applicant: Schaeffler Technologies AG & Co. KG, Herzogenaurach (DE)

(72) Inventors: Alfredo Perez Mitre Jimenez, Wooster, OH (US); Omar Yair Guerra, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 475 days.

(21) Appl. No.: 17/692,391

(22) Filed: Mar. 11, 2022

(65) Prior Publication Data

US 2023/0287959 A1 Sep. 14, 2023

(51) Int. Cl.
*F16F 15/14* (2006.01)
*F16D 3/12* (2006.01)
*F16F 15/123* (2006.01)

(52) U.S. Cl.
CPC .............. *F16F 15/145* (2013.01); *F16D 3/12* (2013.01); *F16F 15/12353* (2013.01); *F16F 2222/08* (2013.01); *F16F 2226/04* (2013.01); *F16F 2232/02* (2013.01); *F16F 2236/08* (2013.01); *Y10T 74/2128* (2015.01)

(58) Field of Classification Search
CPC .................. F15F 15/145; F15F 15/1457
See application file for complete search history.

(56) References Cited

U.S. PATENT DOCUMENTS

| 2,096,999 | A | * | 10/1937 | Sarazin ............... F16F 15/145 464/3 |
| 8,881,622 | B2 | | 11/2014 | Maienschein et al. |
| 9,261,165 | B2 | | 2/2016 | Jung et al. |
| 9,689,462 | B2 | | 6/2017 | Maienschein et al. |

(Continued)

FOREIGN PATENT DOCUMENTS

| CN | 103133595 A * | 6/2013 | ............ F16F 15/145 |
| DE | 102014213862 A1 * | 1/2016 | ............ F16F 15/145 |
| DE | 102015222920 A1 * | 6/2016 | |

(Continued)

OTHER PUBLICATIONS

USPTO Machine Translation (retrieved from FIT database) of DE 102019100349 A1, Dinger, Apr. 9, 2020. (Year: 2024).*

*Primary Examiner* — Daniel D Yabut
(74) *Attorney, Agent, or Firm* — Volpe Koenig

(57) ABSTRACT

A centrifugal pendulum device is provided having a weight carrier disc an opening and guide tracks arranged on a radially outer region thereof and including damper spring openings in a radially inner region thereof. A centrifugal weight is disposed displaceably on the weight carrier disc, with the centrifugal weight including two side elements that each include weight guide tracks, and spacing bolts arranged between the two side elements. At least one of the spacing bolts extends through the opening of the weight carrier disc, and the centrifugal weight is guided displaceably on the weight carrier disc by roller elements that run on the guide tracks and the weight guide tracks. In order to reduce weight and provide additional flexibility, the weight carrier disc comprises a first plate that includes the radially inner region that is connected to at least one second plate that includes the radially outer region.

19 Claims, 6 Drawing Sheets

(56) References Cited

U.S. PATENT DOCUMENTS

| | | | | |
|---|---|---|---|---|
| 2016/0273614 A1* | 9/2016 | Wirachowski | ........ | F16F 15/145 |
| 2019/0285136 A1* | 9/2019 | Ishibashi | ............. | F16F 15/3156 |

FOREIGN PATENT DOCUMENTS

| | | | | | |
|---|---|---|---|---|---|
| DE | 202019102099 | U1 * | 5/2019 | ............ | F16F 15/145 |
| DE | 102018103264 | A1 * | 8/2019 | | |
| DE | 102018126535 | A1 * | 4/2020 | | |
| DE | 102019100349 | A1 * | 4/2020 | | |
| EP | 3708867 | A1 * | 9/2020 | ............ | F16F 15/134 |
| FR | 3025274 | A1 * | 3/2016 | ............ | F16F 15/145 |
| KR | 20170019453 | A  * | 2/2017 | | |

* cited by examiner

SEGMENTED CENTRIFUGAL PENDULUM ABSORBER MASS CARRIER

TECHNICAL FIELD

The disclosure relates to a centrifugal pendulum device, in particular for vibration absorption in the drive train of a motor vehicle.

BACKGROUND

Centrifugal pendulum absorbers are known in the prior art. Centrifugal pendulum absorbers generally include centrifugal weights are arranged displaceably on a weight carrier disc, where the centrifugal weights are provided as side elements on both sides of the weight carrier disc and are connected to one another with spacer bolts. The spacer bolts extend through openings in the weight carrier disc which are dimensioned to allow movement of the centrifugal weight which acts as a pendulum mass to damp vibration. Roller elements are provided which extend axially through the weight carrier disc and into the side elements of the centrifugal weight and contact guide tracks in the weight carrier disc and in the side elements and roll therein so that the displacement of the centrifugal weight relative to the weight carrier disc is guided in a defined path of movement.

In centrifugal pendulum absorbers, the effective torsional vibration damping is dependent on the particular intended torsional vibration order to be damped so that the contour of the guide tracks and/or a mass of the centrifugal weight is adapted to the vibration order to be damped. If, for example, the intention is that the same centrifugal pendulum device is to be used on different internal combustion engines or in drive trains with different internal combustion engines, it can be that the centrifugal pendulum device, which is optimally designed for one internal combustion engine, does not favorably dampen rotary vibrations in another internal combustion engine because the coordination to the individual vibration orders of this internal combustion engine is absent. Therefore, in the prior art, the weight carrier disc and often also the centrifugal weights are exchanged for a basically very similar weight carrier disc or very similar centrifugal weights, in which only the contour of the guide track or weight guide tracks is adapted to the desired vibration order to be damped. This requires an inventory of different parts.

As with most drive system components, there is the need to provide increased flexibility for different applications while maintaining the same functionality and minimizing weight.

SUMMARY

In one aspect, a centrifugal pendulum device is provided having a weight carrier disc including at least one opening and guide tracks arranged on a radially outer region thereof and including damper spring openings in a radially inner region thereof. A centrifugal weight is disposed displaceably on the weight carrier disc, with the centrifugal weight including two side elements that each include weight guide tracks, and spacing bolts arranged between the two side elements. At least one of the spacing bolts extends through the at least one opening of the weight carrier disc, and the centrifugal weight is guided displaceably on the weight carrier disc by roller elements that run on the guide tracks and the weight guide tracks. In order to reduce weight and provide additional flexibility, the weight carrier disc comprises a first plate that includes the radially inner region that is connected to at least one second plate that includes the radially outer region, and the at least one second plate has a thickness that is at least 30% greater than a thickness of the first plate. By providing the second plate that include the guide tracks for the roller elements as a separate component, this not only saves weight in the area of the first plate that can have a reduced thickness since it does not need to support rollers in guide tracks, but also allows for different second plate(s) to be used that have different guide track geometries in order to customize the vibration damping profile for different applications. Here, a plurality of differently configured ones of the second plate(s) can be provided having guide tracks with different geometries, and the second plate(s) is/are selected from the plurality based on a desired geometry of the guide tracks and then connected to the first plate.

In one embodiment, the first plate and the at least one second plate are fastened together by rivets. Alternatively, the first plate and the at least one second plate are connected via a weld or a staked connection.

In one arrangement, the at least one second plate comprises three of the second plates, each defining an arc length of less than 110 degrees. By using multiple second plates that each define a shorter arc length, additional weight savings are achieved. Additionally, production is simplified and less materials are required in comparison to stamping or otherwise forming a unitary weight carrier disc. It is also possible for form the second plate as a single annular part, to also yield weight savings.

In one embodiment, each of the three second plates includes a single one of the openings, and three of the centrifugal weights are provided, with a single one of the spacing bolts of each of the three centrifugal weights passing through a respective one of the single openings in the three second plates.

Preferably, two additional ones of the spacing bolts are connected between the side elements of each of the three centrifugal weights. These additional spacing bolts can be located in the spaces between the three second plates.

The arrangement can further include a disc part connected to the weight carrier disc, and an output part movably located between the disc part and the weight carrier disc, and springs located in the respective damper spring openings configured to act on the weight carrier disc and the output part in order to complete the damper assembly.

In another aspect, a centrifugal pendulum device is provided having a weight carrier disc including openings and guide tracks arranged on a radially outer region thereof and including damper spring openings in a radially inner region thereof. The weight carrier disc comprises a first plate that includes the radially inner region connected to three second plates that form the radially outer region. Each of the second plates defines an arc length that is less than 110 degrees, and one of the openings is defined in each of the second plates. A centrifugal weight is disposed displaceably on each of the second plates. Each of the centrifugal weights includes two side elements that each include weight guide tracks, and spacing bolts arranged between the two side elements. At least one of the spacing bolts extends through the at least one opening of the weight carrier disc, and the centrifugal weights are guided displaceably on the weight carrier disc by roller elements that run on the guide tracks and the weight guide tracks. This arrangement also saves weight in the area of the first plate since it can have a reduced thickness as it does not need to support rollers in guide tracks as well as in the areas between the second plates. This arrangement also allows for different second plates to be used that have different guide track geometries in order to customize the vibration damping profile for different applications.

Here, the first plate and the at least one second plate are fastened together by rivets. However, welding or staking could be used.

The second plates are thicker than the first plate and in a preferred arrangement have a thickness that is at least 30% greater than a thickness of the first plate.

In another aspect, two additional ones of the spacing bolts are connected between the side elements of each of the three centrifugal weights.

In a further aspect of the present disclosure, a method of forming a centrifugal pendulum device is provided and includes the steps of:
  providing a first plate that forms a radially inner region of a weight carrier disc including damper spring openings;
  selecting at least one second plate to form an outer region of the weight carrier disc, the at least one second plate including at least one opening and guide tracks arranged therein, the at least one second plate being selected from a plurality of differently configured ones of the at least one second plate having the guide tracks with different geometries, the at least one second plate having a thickness that is at least 30% greater than a thickness of the first plate;
  assembling a centrifugal weight so that it is disposed displaceably on the at least one second plate, the centrifugal weight including two side elements that each include weight guide tracks, and spacing bolts arranged between the two side elements, with at least one of the spacing bolts extending through the at least one opening of the weight carrier disc, and roller elements for guiding the centrifugal weight being located in the guide tracks and the weight guide tracks for guiding a displacement movement of the centrifugal weight; and
  connecting the first plate to the at least one second plate.

The method may further include that the connecting of the first plate and the at least one second plate includes riveting the first plate to the at least one second plate.

As discussed above, the at least one second plate may comprise three of the second plates, each defining an arc length of less than 110 degrees.

Further, each of the three second plates includes a single one of the openings, and three of the centrifugal weights are provided, with the method including inserting a single one of the spacing bolts of each of the three centrifugal weights through a respective one of the single said openings in the three second plates.

The method can further include connecting two additional ones of the spacing bolts between the side elements of each of the three centrifugal weights. In a preferred arrangement, the two additional ones of the spacing bolts are located in circumferential spaces between the three second plates.

The method can further include connecting a disc part to the weight carrier disc, and movably locating an output part between the disc part and the weight carrier disc, and inserting springs in the respective damper spring openings that are configured to act on the weight carrier disc and the output part in order to form the damper assembly.

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Figure 1:
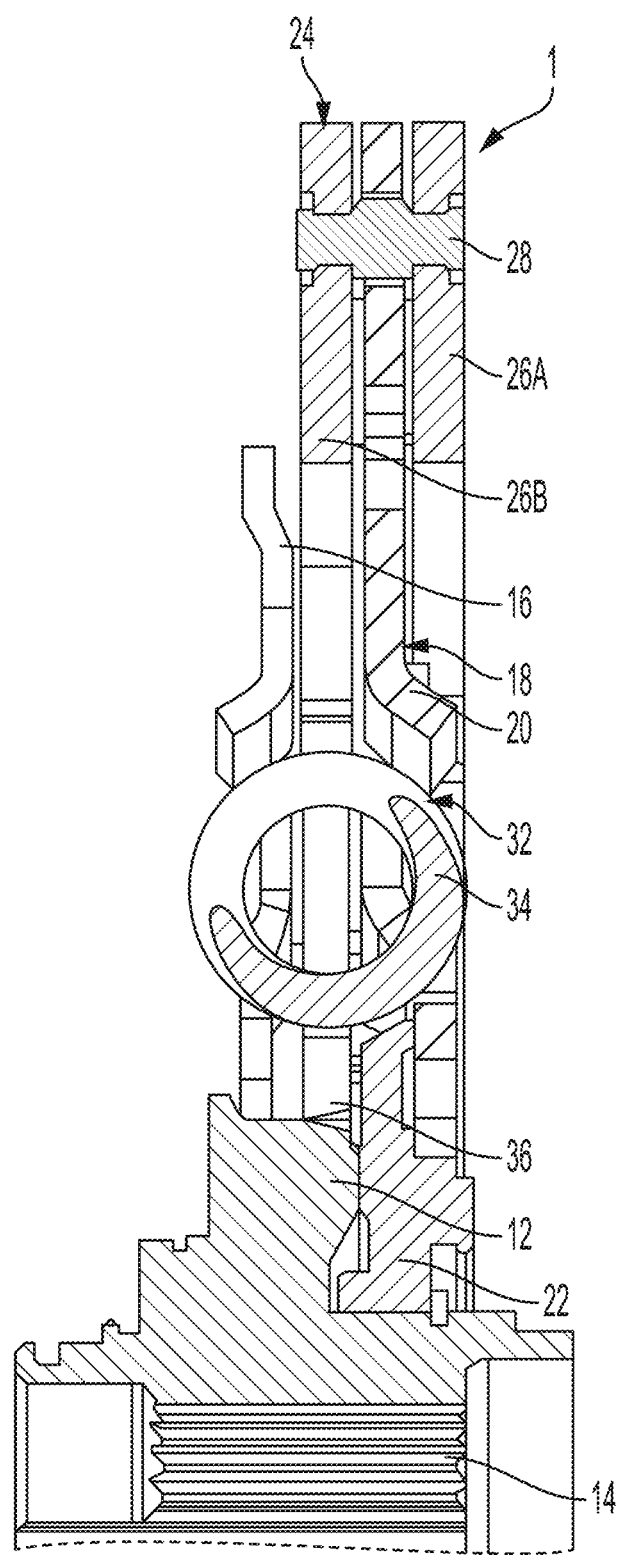
FIG. 1 is a cross-sectional view, in half section, of a prior art damper assembly including a weight carrier disc.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Referring to FIG. 1, a cross-sectional view, in half section, is shown of a prior art damper assembly 1, such as disclosed in U.S. Pat. No. 8,881,622, which is incorporated herein by reference as if fully set forth. The damper assembly 1 includes a drive hub 12 having teeth 14 that connect to an output, for example, a transmission. An input disc 16 which can be connected to a disc carrier or other input is provided and is connected to a centrifugal pendulum device 18 that includes a weight carrier disc 20 on which centrifugal weights 24 are movably mounted. The weights 24 are typically equally distributed about the circumference of the weight carrier disc 20, and typically 3 or 4 weights 24 are provided. The weight carrier disc 20 is connected to a turbine hub 22 in the U.S. Pat. No. 8,881,622 which is rotatably supported on the drive hub 12. The centrifugal weights 24 each include side elements 26A, 26B that are connected together via spacing bolts 28 and are guided via rollers (not shown) within guide tracks formed in the weight carrier disc 20 as well as weight guide tracks (not shown) in the side elements 26A, 26B. Springs 34 are located in spring openings 32 defined in the weight carrier disc 20 and are arranged to act between the weight carrier disc 20 and a damper output part 36 that is connected to the drive hub 12. The prior art damper assembly 1 damps vibrations via relative movements between the input disc 16 which is rotatably fixed with the weight carrier disc 20 and the damper output part 36, with the vibrations being damped by the movement of the centrifugal weights 24 along the guide tracks as the driving force is transmitted via the springs 34.

In this prior art known arrangement, the weight carrier disc 20 is formed of a single stamped steel part having a generally uniform thickness throughout which is designed in order to absorb the contact stresses created at the roller surface along the guide tracks formed in the weight carrier disc 20. However, this results in an over-dimensioning of the inner portion of the weight carrier disc 20 which supports the damper springs in the damper spring openings 32.

Figure 2:
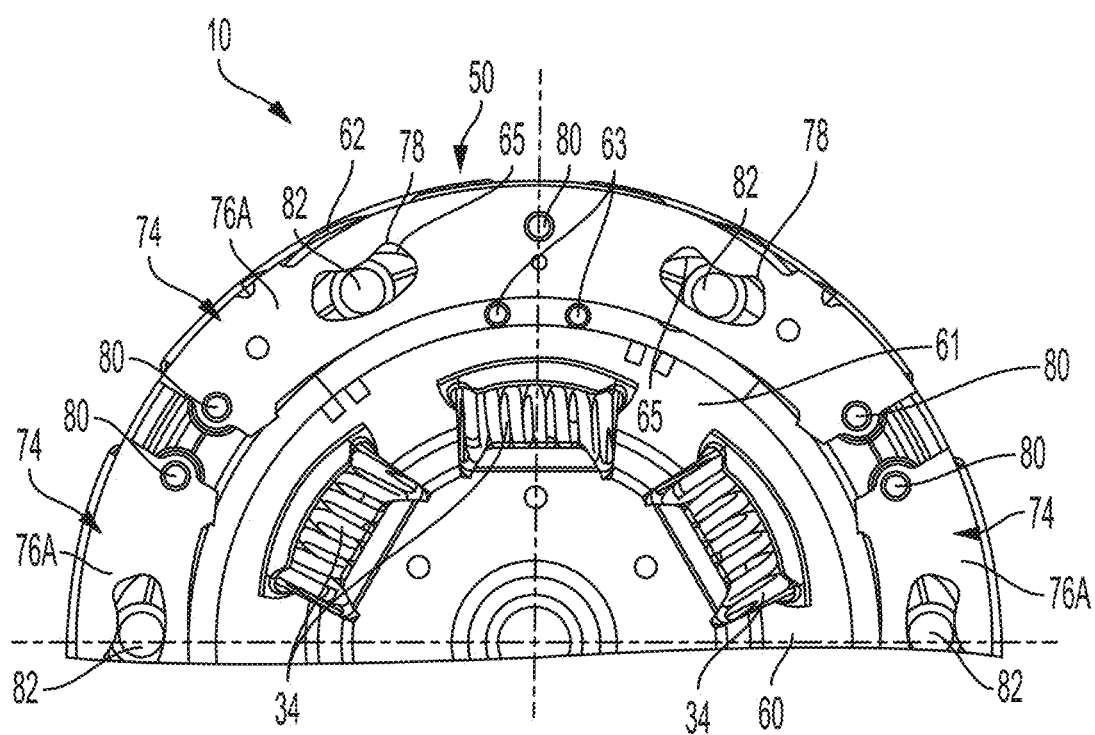
FIG. 2 is a front view, in half section, of a damping assembly with a centrifugal pendulum device including a weight carrier disc in accordance with the present disclosure.

Referring now to FIGS. 2-7, a centrifugal pendulum device 50 for a damper assembly 10 according to the present disclosure is provided. While FIG. 2 shows a front view of the assembled damper assembly 10 including the present centrifugal pendulum device 50, FIGS. 3-7 show the present centrifugal pendulum device 50 in detail.

As shown in FIGS. 3-7, the centrifugal pendulum device 50 includes a weight carrier disc 60 having at least one opening 64 and a guide track 65 (preferably a plurality of guide tracks 65) arranged on a radially outer region 66 thereof and further includes damper spring openings 68, as well as spring support for flanges 70, arranged in a radially inner region 72 thereof.

Figure 4:
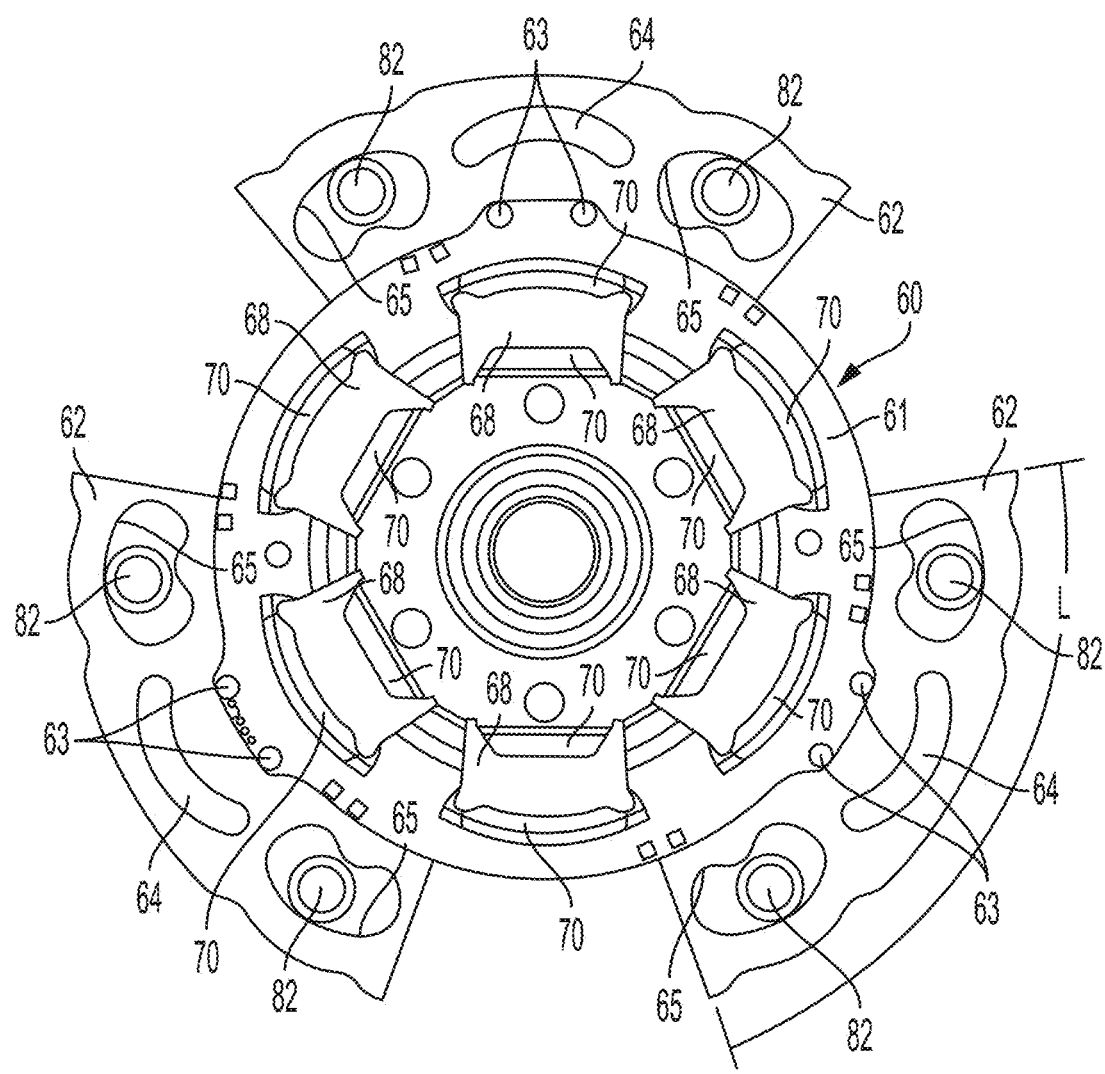
FIG. 4 is a front view of the weight carrier disc, shown without the assembled weights.

As shown in detail in FIG. 4, the weight carrier disc 60 includes a first plate 61 that includes the radially inner region 72 and is connected to at least one second plate 62A-62C, and preferably three second plates 62A-62C, that includes the radially outer region 66. As shown in detail in FIGS. 5 and 7, the at least one second plate 62A-62C has a thickness T2 that is at least 30% greater than a thickness T1 of the first plate 61. More preferably, the thickness T1 of the first plate is at least 50% less than the thickness of the at least one second plate 62A-62C, depending on the particular load requirement. Preferably, both the first plate 61 and the at least one second plate 62A-62C are mare of stamped steel. Here, the first plate 61 and the at least second plate 62A-62C are fastened together by rivets 63. Alternatively, the first plate 61 and the at least one second plate 62A-62C can be connected via a weld or a staked connection.

In the first embodiment the at least one second plate 62A-62C includes three of the second plates 62a, 62b, 62c, each defining an arc length L of less than 110°. More preferably, each of the second plates 62A-62C has an arc length L that is less than 90°

Figure 3:
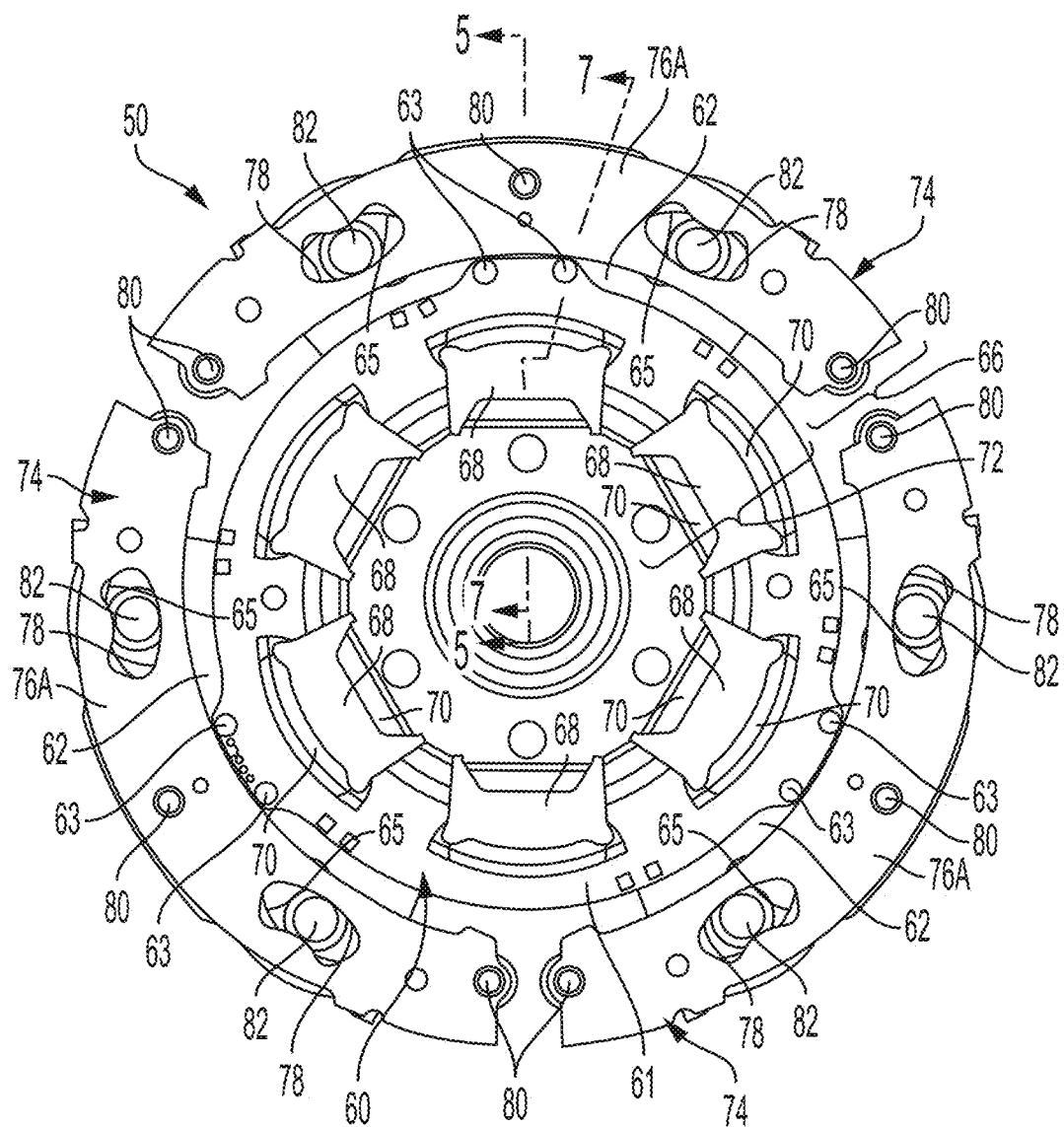
FIG. 3 is a front view of the assembled centrifugal pendulum device with the weight carrier disc.

As shown in detail in FIGS. 3 and 4, each of the three second plate 62A-62C includes a single one of the opening 64, which, as shown in FIG. 4, has an arc-shaped path with the ends of the arc-shape being directed radially inwardly toward a center of the centrifugal pendulum device 50. The shape of this path may vary depending upon the particular application and the frequency of the oscillations to be damped.

Figures 5, 6, 7:
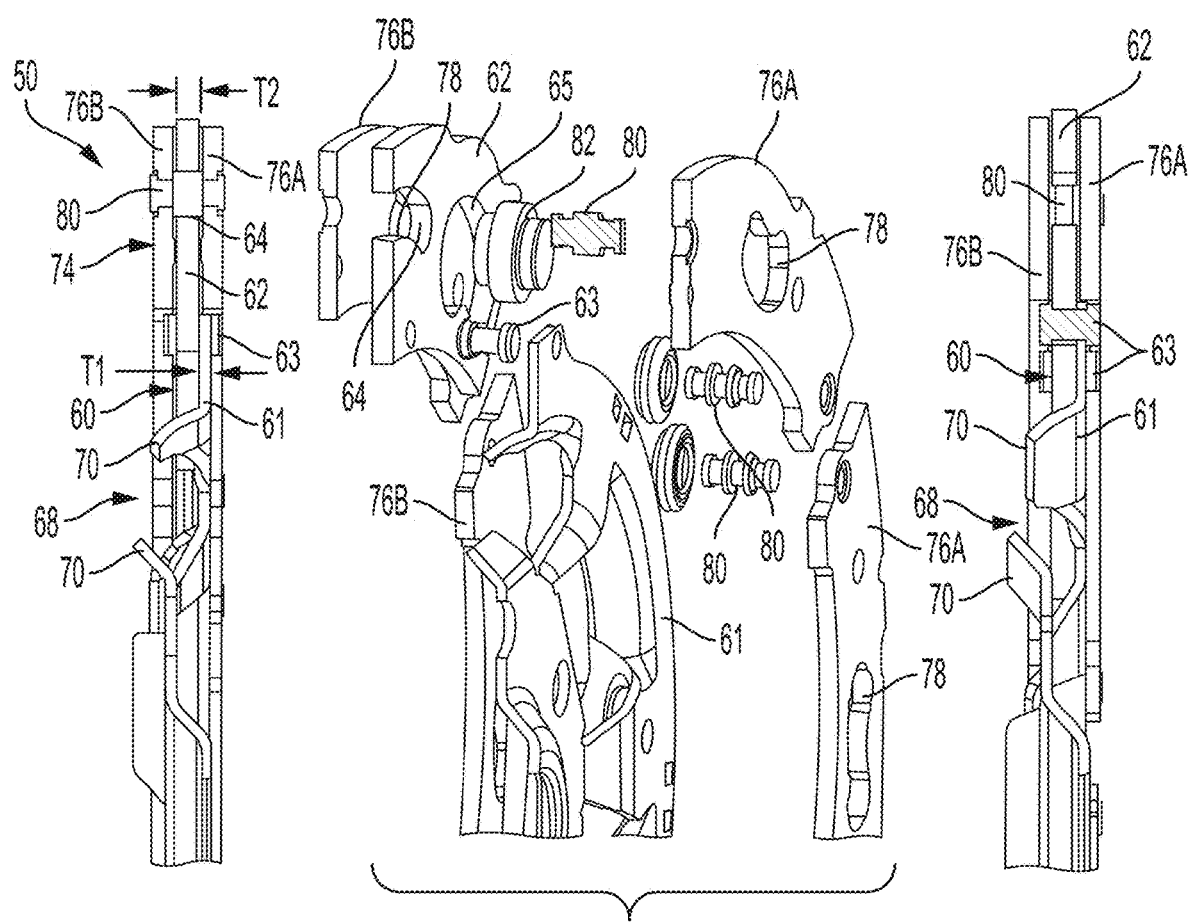
FIG. 5 is a cross-sectional view taken along line 5-5 in FIG. 3.
FIG. 6 is an exploded isometric view showing a part of the assembly of the centrifugal pendulum device used in the damper assembly shown in FIG. 2.
FIG. 7 is a cross-sectional view taken along lines 7-7 in FIG. 3.

As shown in FIGS. 2, 3, and 6, in this case three of the centrifugal weights 74 are provided.

The centrifugal weights 74 are disposed displaceably on the weight carrier disc 60, and each of the centrifugal weights 74 includes two side elements 76A, 76B that each include weight guide tracks 78, in this case formed as arc-shaped cutouts, with the ends of the arc-shape facing radially outwardly. Spacing bolts 80 are arranged between the two side elements 76A, 76B, and at least one of the spacing bolts 80 extends through the at least one opening 64 of the weight carrier disc 60. Each of the centrifugal weights 74 is guided displaceably on the weight carrier disc 60 by roller elements 82, best shown in FIGS. 2 and 6, that have a stepped profile with the center portion being guided in to respective guide track 65 of the weight carrier disc 60 and the end portions being guided in the weight guide track 78 of the two side elements 76A, 76B of the centrifugal weight 74.

In each case a single one of the spacing bolts 80 of each of these three centrifugal weights 74 passes through a respective one of the single opening 64 in the three second plates 62A-62C.

As best seen in FIG. 3, two additional ones of the spacing bolts 80 are connected between the side elements 76A, 76B of each of the three centrifugal weights 74, with these additional ones of the spacing bolts 80 being located in the spaces between the three second pates 62A-62C.

In order to provide flexibility in connection with the design of the centrifugal pendulum device 50, there can be a plurality of differently configured ones of the second plate 62A-62C having guide tracks 65 with different geometries. These can be specifically tuned to different vibrations to be absorbed. In this case, a particular set of second plates 62A-62C can be selected based on a desired geometry of these guide tracks 65 and then assembled with the first plate 61 using the rivets 63 or the other connecting methods noted above. This allows fewer parts to be carried in inventory and to the extent that separate second plates 62A-62C are provided, these can be more easily manufactured than a single large stamped part as in the weight carrier disc 20 of the prior art.

In order to form the complete centrifugal pendulum device, a disc part 16, similar to that shown in FIG. 1 is connected to the weight carrier disc 60, and an output part 36, similar to that shown in FIG. 1 is moveably located between the disc part 16 and the weight carrier disc 60. Springs 34 are located in the respective damper springs opening 68 and are configured to act on the weight carrier disc 60 and the output part 36 in order to provide damping between a rotatory input to the input disc 16 and a rotatory output delivered via the output part 36, which can be connected to a drive hub, similar to the drive hub 12 in FIG. 1.

A preferred aspect of the invention includes the weight carrier disc 60 being assembled as discussed above in connection with FIGS. 2-7 using the three second plates 62A-62C, with each defining an arc length L of less than 110°, and in this case, the arc length being less than 90° in order to provide more weight savings. Here, the centrifugal weights 74 as discussed above are arranged with the additional spacing bolts 80 arranged at each circumferential end of each of the centrifugal weights 74 such that they are located in the spaces between the second plate 62A-62C.

Figure 8:
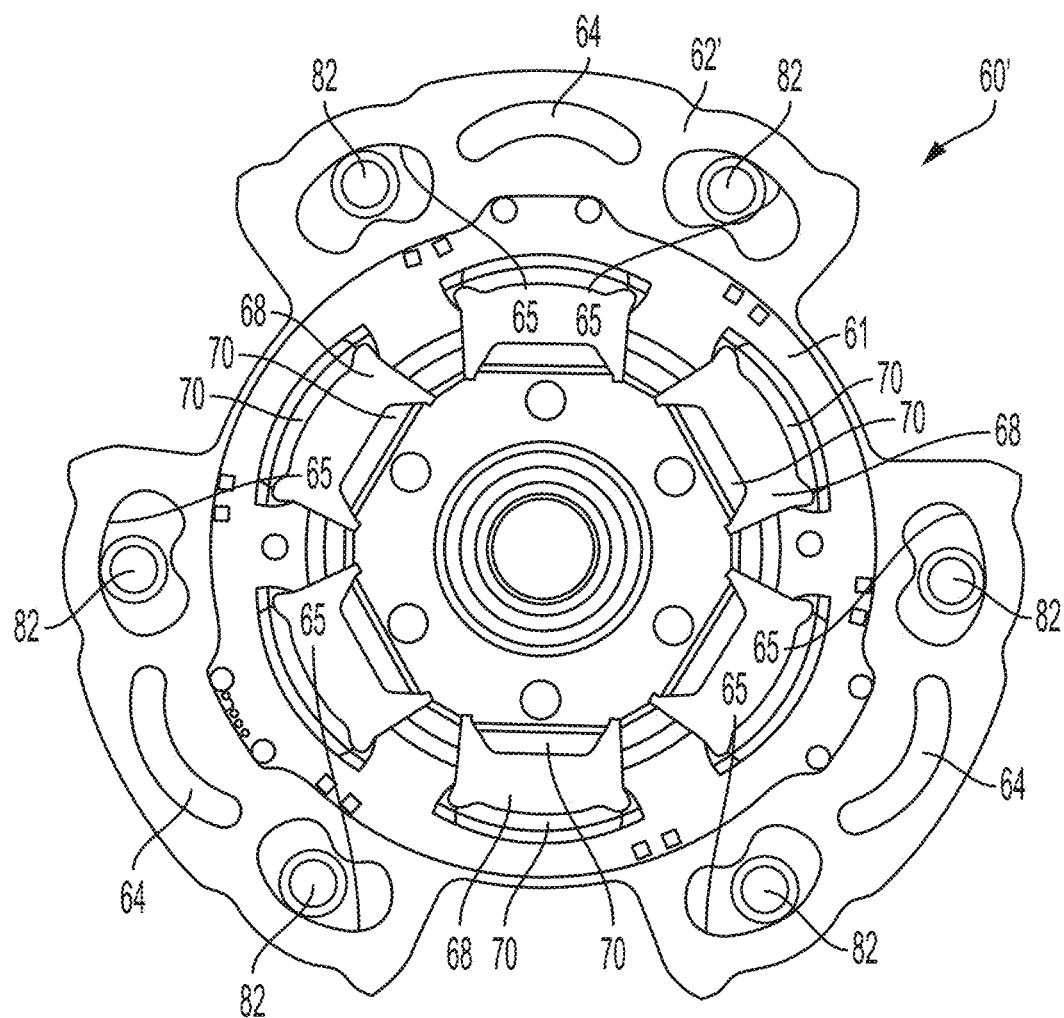
FIG. 8 is a front view of an alternate embodiment of the weight carrier disc used in connection with the present centrifugal pendulum device.

Referring now to FIG. 8, and alternate embodiment of the weight carrier disc 60' is shown. The alternate embodiment of the weight carrier disc 60' is formed as a single annular second plate 62' that includes the radially outer region 66 with the at least one opening 64 and the guide track 65, as discussed above in connection with the first embodiment of the centrifugal pendulum device 50. The weight carrier disc 60' includes a single second plate 62' which can ease assembly as handling two or more of the second plates 62A-62C is not required.

In another aspect, a method for forming a centrifugal pendulum device 50 of a damper assembly is provided. The method includes the steps of:

Providing a first plate 61 that forms a radially inner region 72 of a weight carrier disc 60, with the first plate 61 including damper spring openings 68;

Selecting at least one second plate 62A-62C to form an outer region 66 of the weight carrier disc 60, with the at least one second plate 62A-62C including at least one opening 64 and a guide track and 65 arranged therein, the at least one second plate 62A-62C being selected from a plurality of differently configured ones of the at least one second plate 62A-62C having guide tracks with different geometries, with the at least one second plate 62A-62C having a thickness T2 that is at least 30% greater than a thickness T1 of the first plate 61;

Assembling a centrifugal weight 74 so as to be displaceable on the at least one second plate 62A-62C, with the centrifugal weight 74 including two side elements 76A, 76B, that each include weight guide tracks 78, and arranging spacing bolts 80 between the two side elements 7Aa, 76B with at least one of the spacing bolts 80 extending through the at least one opening 64 of the weight carrier disc 60, and roller elements 82 for guiding the centrifugal weight 74 being located in the guide track 65 of the weight carrier disc 60 and the weight guide track 78 in the side elements 76A, 76B of the centrifugal weight 74 for guiding a displacement movement of the centrifugal weight 74; and Connecting the first place 61 to the at least one second plate 62A-62C. The connecting is preferably accomplished by a riveting; however, other types of fastening, such as staking or welding can be utilized.

As discussed in connection with the embodiment FIGS. 2-7, preferably the at least one plate 62A-62C is provided as three of the second plates 62A-62C, with each defining an arc length L of less than 120°, more preferably less than 110°, most preferably 90° or less.

The method further includes inserting a single one of the spacing bolts 80 of each of the three centrifugal weights 74 through a respective one of the single openings 64 in the three second plates 62A-62C. The method further includes connecting two additional ones of the spacing bolts 80 between the side elements 76A, 76B of each of the three centrifugal weights 74, with the two additional ones of the spacing bolts 80 preferably being located in circumferential spaces between the three second plates 62A-62C.

In order to form the damper assembly, a disc part, such as the disc part 16 described in connection with FIG. 1 is connected to the weight carrier disc 60, and an output part, such as the output part 36 described above in connection with FIG. 1 is moveably located between the disc part 16 and the weight carrier disc 60. Springs, similar to the springs 34 described above, are inserted in the respective damper spring openings 68 and are configured to act on the weight carrier disc 60 as well as the output part in order to provide damping of a rotary force transmitted between the disc part 16 and the output part 36.

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 1 prior art damper assembly
10 damper assembly
12 drive hub
14 teeth
16 input disc
18 centrifugal pendulum device
20 weight carrier disc
22 turbine hub
24 centrifugal weights
26A, 26B side elements
28 spacing bolts
32 spring openings
34 springs
36 damper output part
50 centrifugal pendulum device
60, 60' weight carrier disc
61 first plate
62A-62C second plate(s)
62' second plate
63 rivet
64 opening
65 guide track
66 radially outer region
68 damper spring openings
70 flanges
72 radially inner region
74 centrifugal weights
76A, 76B side elements
78 weight guide tracks
80 spacing bolt
82 roller element
L arc length
T1 first thickness
T2 second thickness

The invention claimed is:

1. A centrifugal pendulum device for a damper assembly, comprising:
  a weight carrier disc including at least one opening and guide tracks arranged on a radially outer region thereof and including damper spring openings in a radially inner region thereof;
  a centrifugal weight disposed displaceably on the weight carrier disc, the centrifugal weight including two side elements that each include weight guide tracks, and spacing bolts arranged between the two side elements, at least one of the spacing bolts extending through the at least one opening of the weight carrier disc, the centrifugal weight being guided displaceably on the weight carrier disc by roller elements that run on the guide tracks and the weight guide tracks; and
  the weight carrier disc comprises a first plate that includes the radially inner region connected to at least one second plate that includes the radially outer region, and the at least one second plate has a thickness that is at least 30% greater than a thickness of the first plate.

2. The centrifugal pendulum device of claim 1, wherein the first plate and the at least one second plate are fastened together by rivets.

3. The centrifugal pendulum device of claim 1, wherein the first plate and the at least one second plate are connected via a weld or a staked connection.

4. The centrifugal pendulum device of claim 1, wherein the at least one second plate comprises three of the second plates, each defining an arc length of less than 110 degrees.

5. The centrifugal pendulum device of claim 4, wherein each of the three second plates includes a single said opening, and three of the centrifugal weights are provided, and a single one of the spacing bolts of each of the three centrifugal weights passes through a respective one of the single said openings in the three second plates.

6. The centrifugal pendulum device of claim 5, wherein two additional ones of the spacing bolts are connected between the side elements of each of the three centrifugal weights.

7. The centrifugal pendulum device of claim 1, wherein the at least one second plate comprises a single annular plate.

8. The centrifugal pendulum device of claim 1, further comprising a disc part connected to the weight carrier disc, and an output part movably located between the disc part and the weight carrier disc, and springs located in the respective damper spring openings configured to act on the weight carrier disc and the output part.

9. The centrifugal pendulum device of claim 1, wherein there are a plurality of differently configured ones of the at least one second plate having the guide tracks with different geometries, and the at least on second plate is selected from the plurality based on a desired geometry of the guide tracks.

10. A centrifugal pendulum device for a damper assembly, comprising:
    a weight carrier disc including openings and guide tracks arranged on a radially outer region thereof and including damper spring openings in a radially inner region thereof;
    the weight carrier disc comprises a first plate that includes the radially inner region connected to three second plates that form the radially outer region, each of the second plates defining an arc length of less than 110 degrees, and one of the openings is defined in each of the second plates; and
    a centrifugal weight disposed displaceably on each of the second plates, each of the centrifugal weights including two side elements that each include weight guide tracks, and spacing bolts arranged between the two side elements, at least one of the spacing bolts extending through the at least one opening of the weight carrier disc, the centrifugal weight being guided displaceably on the weight carrier disc by roller elements that run on the guide tracks and the weight guide tracks, wherein the first plate and the second plates are fastened together by rivets.

11. The centrifugal pendulum device of claim 10, wherein the second plates have a thickness that is at least 30% greater than a thickness of the first plate.

12. The centrifugal pendulum device of claim 10, wherein two additional ones of the spacing bolts are connected between the side elements of each of the three centrifugal weights.

13. A method of forming a centrifugal pendulum device, the method comprising:
    providing a first plate that forms a radially inner region of a weight carrier disc including damper spring openings;
    selecting at least one second plate to form an outer region of the weight carrier disc, the at least one second plate including at least one opening and guide tracks arranged therein, the at least one second plate being selected from a plurality of differently configured ones of the at least one second plate having the guide tracks with different geometries, the at least one second plate having a thickness that is at least 30% greater than a thickness of the first plate;
    assembling a centrifugal weight so that it is disposed displaceably on the at least one second plate, the centrifugal weight including two side elements that each include weight guide tracks, and spacing bolts arranged between the two side elements, with at least one of the spacing bolts extending through the at least one opening of the weight carrier disc, and roller elements for guiding the centrifugal weight being located in the guide tracks and the weight guide tracks for guiding a displacement movement of the centrifugal weight; and
    connecting the first plate to the at least one second plate.

14. The method of claim 13, wherein the connecting of the first plate and the at least one second plate includes riveting the first plate to the at least one second plate.

15. The method of claim 13, wherein the at least one second plate comprises three of the second plates, each defining an arc length of less than 120 degrees.

16. The method of claim 15, wherein each of the three second plates includes a single said opening, and three of the centrifugal weights are provided, and the method includes inserting a single one of the spacing bolts of each of the three centrifugal weights through a respective one of the single said openings in the three second plates.

17. The method of claim 16, further comprising connecting two additional ones of the spacing bolts between the side elements of each of the three centrifugal weights.

18. The method of claim 17, wherein the two additional ones of the spacing bolts are located in circumferential spaces between the three second plates.

19. The method of claim 18, further comprising connecting a disc part to the weight carrier disc, and movably locating an output part between the disc part and the weight carrier disc, and inserting springs in the respective damper spring openings that are configured to act on the weight carrier disc and the output part.

* * * * *